United States Patent
Lackey et al.

(10) Patent No.: US 9,956,511 B2
(45) Date of Patent: May 1, 2018

(54) REUSABLE WATER FILTER CARTRIDGE DEVICE

(71) Applicants: Robert William Lackey, Hickory, NC (US); Robert Charles Beckmann, Vale, NC (US); Glenn F. Cueman, Denver, NC (US)

(72) Inventors: Robert William Lackey, Hickory, NC (US); Robert Charles Beckmann, Vale, NC (US); Glenn F. Cueman, Denver, NC (US)

(73) Assignee: Protect Plus, LLC, Hickory, NC (US)

( * ) Notice: Subject to any disclaimer, the term of this patent is extended or adjusted under 35 U.S.C. 154(b) by 167 days.

(21) Appl. No.: 14/657,211

(22) Filed: Mar. 13, 2015

(65) Prior Publication Data

US 2015/0258477 A1    Sep. 17, 2015

Related U.S. Application Data

(60) Provisional application No. 61/953,006, filed on Mar. 14, 2014.

(51) Int. Cl.
| | |
|---|---|
| *B01D 35/30* | (2006.01) |
| *B01D 29/11* | (2006.01) |
| *C02F 1/28* | (2006.01) |
| *C02F 1/00* | (2006.01) |

(52) U.S. Cl.
CPC ............. *B01D 35/30* (2013.01); *B01D 29/11* (2013.01); *C02F 1/283* (2013.01); *B01D 2201/24* (2013.01); *B01D 2201/303* (2013.01); *B01D 2201/4015* (2013.01); *C02F 1/001* (2013.01); *C02F 2201/006* (2013.01)

(58) Field of Classification Search
CPC .................... B01D 35/30; B01D 29/11; B01D 2201/4015; B01D 2201/303; B01D 2201/24; C02F 1/283; C02F 1/001; C02F 2201/006
USPC .............. 210/232, 450, 435, 440–444, 493.2
See application file for complete search history.

(56) References Cited

U.S. PATENT DOCUMENTS

| | | | |
|---|---|---|---|
| 4,867,993 | A | 9/1989 | Nordskog |
| 5,066,391 | A | 11/1991 | Faria |
| 5,076,912 | A | 12/1991 | Belz et al. |
| 5,128,034 | A | 7/1992 | Kool |
| 5,256,287 | A | 10/1993 | Underwood |
| 5,935,426 | A | 8/1999 | Giordano et al. |
| 6,024,229 | A | 2/2000 | Ayers |
| 6,120,685 | A | 9/2000 | Carlson et al. |
| 6,290,848 | B1 | 9/2001 | Tanner et al. |
| 6,602,410 | B1 | 8/2003 | Tanner et al. |
| 6,638,426 | B1 | 10/2003 | Fritter et al. |
| 6,862,943 | B2 | 3/2005 | Tibbets et al. |
| 6,919,025 | B2 * | 7/2005 | Cluff ........................ C02F 1/002 210/244 |
| 7,540,957 | B1 * | 6/2009 | Kurth .................... B01D 61/025 156/293 |

(Continued)

*Primary Examiner* — Madeline Gonzalez
(74) *Attorney, Agent, or Firm* — Seth L. Hudson; Clements Bernard Walker, PLLC (57) ABSTRACT

The present invention provides methods and systems for a reusable water filter cartridge that includes a top portion with a pair of spaced apart bores for receiving an elongate member that is inserted through the bores, and a bottom portion selectively secured to the top portion and including a cavity. A filter element is contained within the cavity.

15 Claims, 10 Drawing Sheets

(56) References Cited

U.S. PATENT DOCUMENTS

| | | |
|---|---|---|
| 8,043,502 B2 | 10/2011 | Nauta |
| 8,080,160 B2 | 12/2011 | Yanou et al. |
| 2004/0222145 A1* | 11/2004 | Onoue ................... B01D 29/96 210/435 |
| 2005/0000867 A1 | 1/2005 | Haynes et al. |
| 2006/0000763 A1 | 1/2006 | Rinker et al. |
| 2006/0032795 A1 | 2/2006 | Warren et al. |
| 2007/0108119 A1* | 5/2007 | Mandt ................... B01D 27/08 210/424 |
| 2007/0215536 A1 | 9/2007 | Bommi et al. |
| 2007/0221561 A1 | 9/2007 | Funkhouser et al. |
| 2008/0110820 A1 | 5/2008 | Knipmeyer et al. |
| 2008/0223797 A1 | 9/2008 | Reid et al. |
| 2014/0042073 A1 | 2/2014 | Patera et al. |

\* cited by examiner

REUSABLE WATER FILTER CARTRIDGE DEVICE

CROSS REFERENCE TO RELATED PATENT APPLICATION

The current application claims the benefit of the earlier priority filing date of provisional application Ser. No. 61/953,006 that was filed on Mar. 14, 2014.

FIELD OF THE INVENTION

The present invention relates generally to reusable water filter cartridge device for use in-line and under sink systems.

BACKGROUND OF THE INVENTION

Water quality is an issue that is of continuing concern. Despite the continuing efforts of the Environmental Protection Agency (EPA) and state and local water agencies, often water that is used for drinking, cooking, bathing, and the like is far from pure. For example, if water is supplied by a well, it could be affected by contaminants in the ground water. Even if water is supplied through a municipal water treatment facility, there are many contaminants that may slip through. Some of these contaminants are not considered harmful, e.g., they only do things like stain teeth, or give water an unpleasant odor, taste or appearance. To complicate things still further, the very chemicals that are put in water to kill harmful bacteria leave traces in the water, and make it unhealthy or unpleasant for bathing or drinking. Accordingly, home water filters are being used on a wide scale.

One common mechanism for home water filters includes granular activated carbon filtering: a form of activated carbon with a high surface area that absorbs many compounds including many toxic compounds. Water passing through activated carbon is commonly used in municipal regions with organic contamination, bad taste, odors, or the like.

Filter elements, including filter cartridges, are used in drinking water pitchers and attached to faucets to improve the taste of the water and/or remove contaminants. These elements are made of plastic housings with treatment media enclosed in them with porous tops and bottoms to allow untreated water to enter from the top and treated filtered water passing through the media to flow out of the element from pores on the bottom. These filter elements are very popular and are used and entirely discarded in substantial quantities every year. This is creating an environmental disposal problem of major proportions. It is an object of the present invention to create a device for reuse where only the treatment element is replaced, but the housing or cartridge is reusable.

BRIEF SUMMARY OF THE INVENTION

According to an embodiment of the present invention, a reusable water filter cartridge device includes a bottom portion with a pair of spaced apart bores for receiving an elongate member that is inserted through the bores, a top portion selectively secured to the bottom portion and containing a cavity, and a filter element contained within the cavity.

According to another embodiment of the present invention, the reusable water filter cartridge device includes an o-ring disposed between the bottom portion and the top portion to create a water tight seal between the bottom portion and the top portion.

According to yet another embodiment of the present invention, the reusable water filter cartridge device includes a bottom portion that contains external threads and the top portion contains corresponding inner threads that receive the external threads of the bottom portion for selectively securing the bottom portion and the top portion.

According to yet another embodiment of the present invention, the reusable water filter cartridge device includes a bottom portion with an upper portion and a lower portion, whereby the upper portion contains an annular circular side with a cavity therein, and the lower portion contains external threads.

According to yet another embodiment of the present invention, the reusable water filter cartridge device includes a cover engaged to the bottom portion for receiving the elongate member and allowing the elongate member to translate within the cover.

According to yet another embodiment of the present invention, the reusable water filter cartridge device includes a cover that is selectively secured to the bottom portion and receives the elongate member therein, the elongate member contains a slot disposed longitudinally on its surface and the cover contains a pin extending therefrom that is received within the slot.

According to yet another embodiment of the present invention, the reusable water filter cartridge device includes a filter element that has a top side, a bottom side, and a carbon block disposed between the top side and the bottom side, whereby the top side and bottom side contain at least one notch.

According to yet another embodiment of the present invention, the reusable water filter cartridge device includes a cavity with an inner side of the cavity containing at least one elongate rib for receiving at least one corresponding notch contained on the filter element.

According to yet another embodiment of the present invention, the reusable water filter cartridge device includes a bottom portion, a top portion containing a cavity having an external side and an interior side, and at least one elongate rib disposed on the interior side of the cavity of the top portion. A disposable element having a top side and a bottom side is contained within the cavity, wherein the bottom portion and top portion are selectively secured to one another. At least one notch is disposed on the top side and bottom side of the disposable element for receiving the at least one elongate rib disposed on the interior side of the cavity.

According to yet another embodiment of the present invention, the reusable water filter cartridge device includes a bottom portion with an annular side containing a cavity therein, whereby the annular circular side contains two bores for receiving an elongate member.

According to yet another embodiment of the present invention, the reusable water filter cartridge device includes a cover disposed within the cavity of the bottom portion, and a bore disposed within the bottom portion for receiving a stop pin that extends into a slot disposed on the elongate member.

According to yet another embodiment of the present invention, the reusable water filter cartridge device includes at least one dimple disposed on the elongate member.

According to yet another embodiment of the present invention, the reusable water filter cartridge device includes a valve containing a water inlet and a water outlet disposed on the top portion.

According to yet another embodiment of the present invention, the reusable water filter cartridge device includes at least one wing extending generally outwardly from the top portion.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
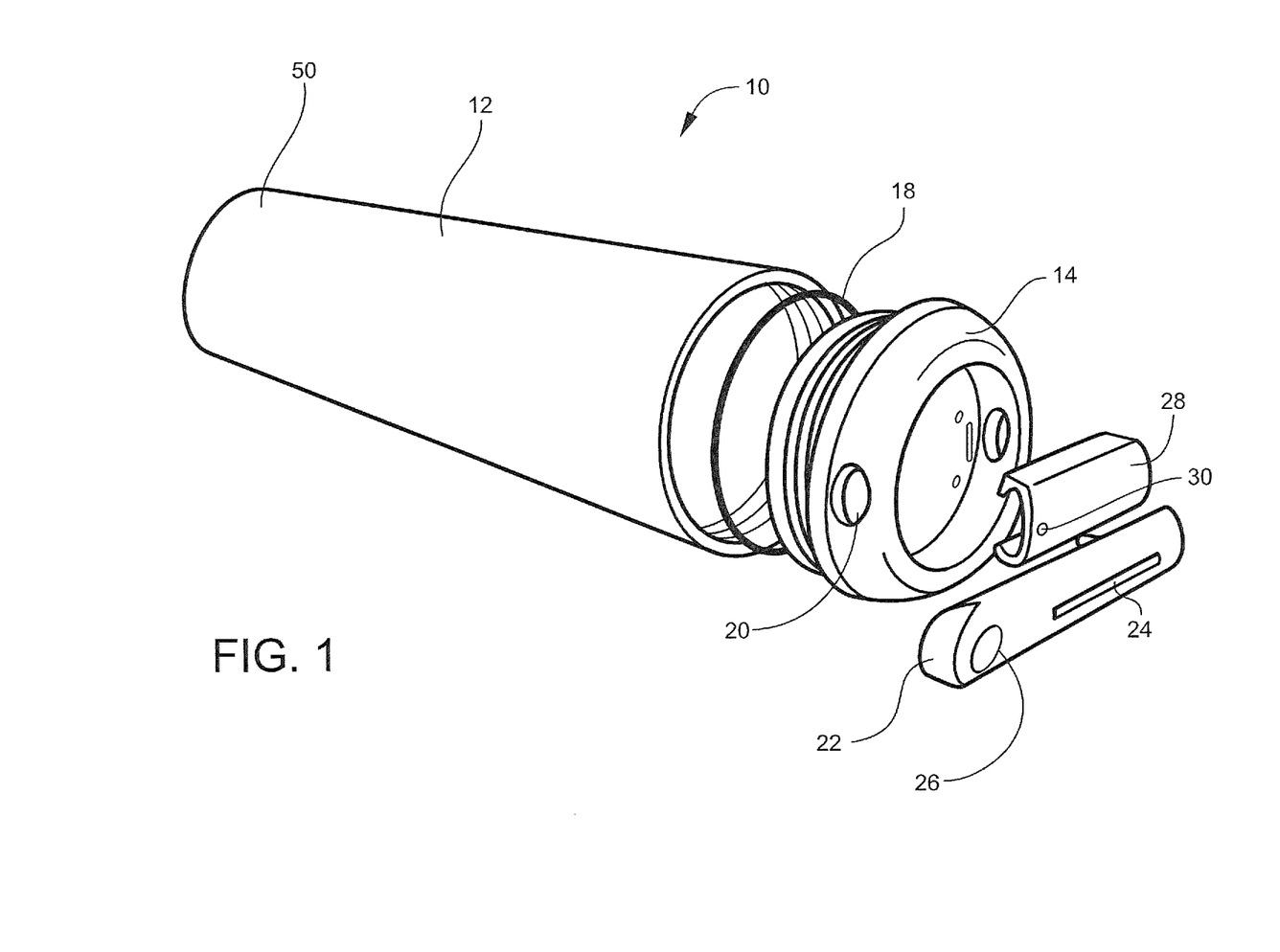
FIG. 1 is a perspective view of an embodiment of the present invention.

Referring now specifically to the drawings, an improved reusable water filter cartridge device is illustrated in FIG. 1 and is shown generally at reference numeral 10. The device 10 includes a bottom portion 12, a top portion 14, a filter element 16 and a connection mechanism, such as an o-ring 18, to engage the bottom portion 12 to the top portion 14 and to seal the disposable element within the bottom portion 12 and the top portion 14 such that substantially all of the water entering the device 10 is subjected to the filter element 16.

Figure 3:
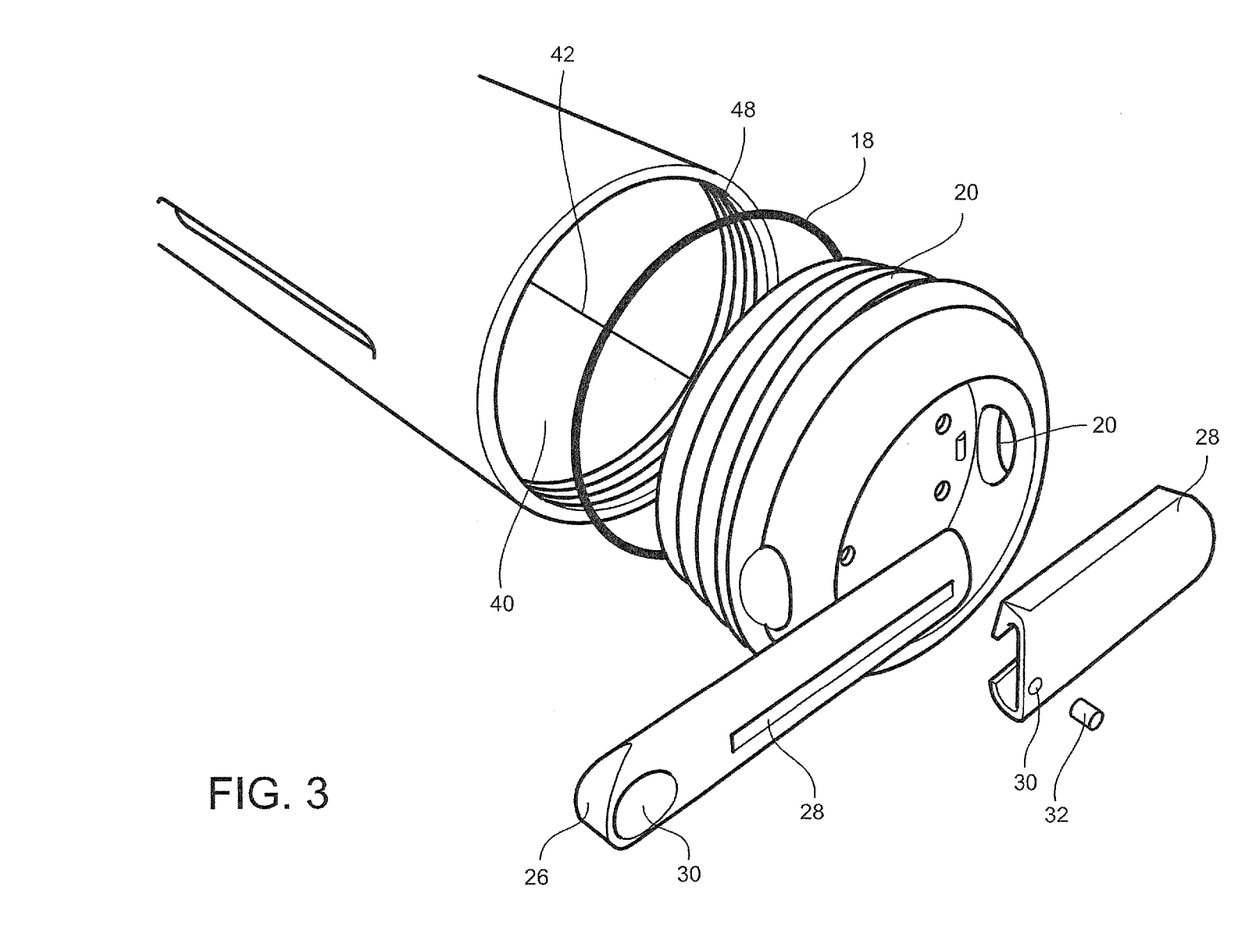
FIG. 3 is an exploded view of an embodiment of the present invention.

As shown in FIGS. 1 and 3, the device 10 contains one or more o-rings 18 that are operable to create a seal between the bottom portion 12 and top portion 14. The o-ring 18 is preferably made of a compressible rubber that forms a water tight seal between the bottom portion 12 and top portion 14. The top portion 14 contains a first side and second side, wherein the bottom portion 12 is selectively engaged to the first side of the top portion 14. A seat is disposed within the internal surface of the first side for serving as a seat for the o-ring 18.

Figure 6:
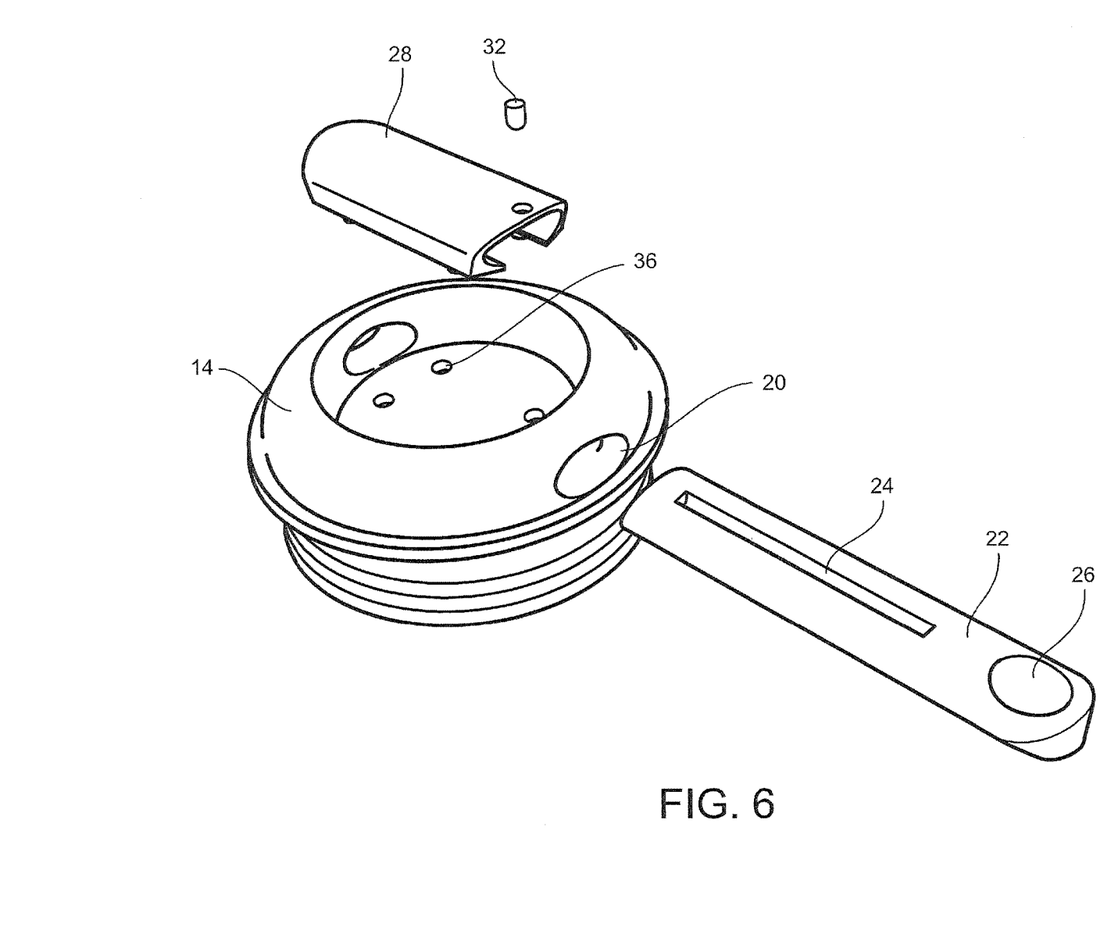
FIG. 6 is an exploded view of an embodiment of the bottom portion of the present invention.
Figure 8:
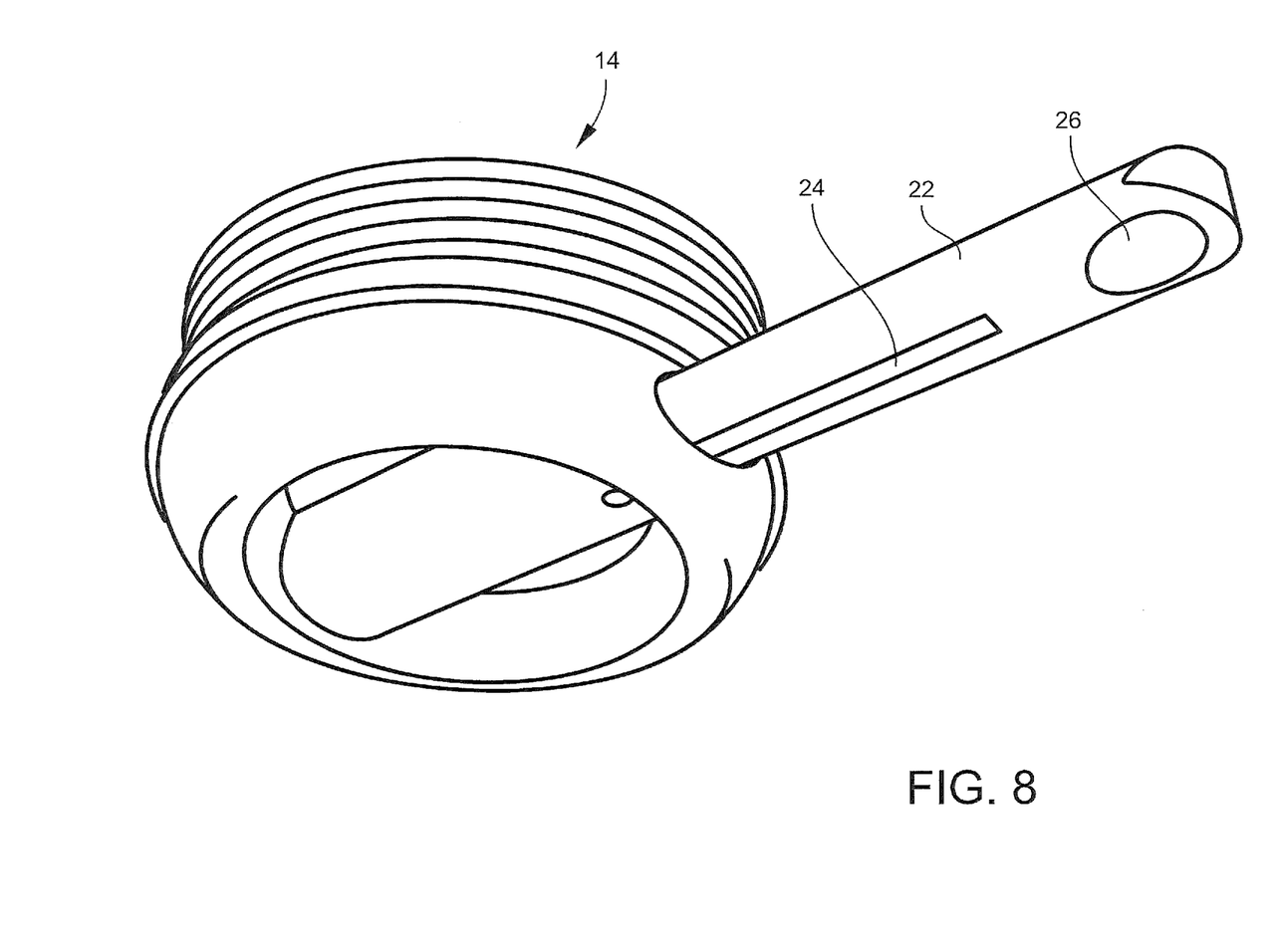
FIG. 8 is a perspective view of an embodiment of the bottom portion of the present invention.
Figure 9:
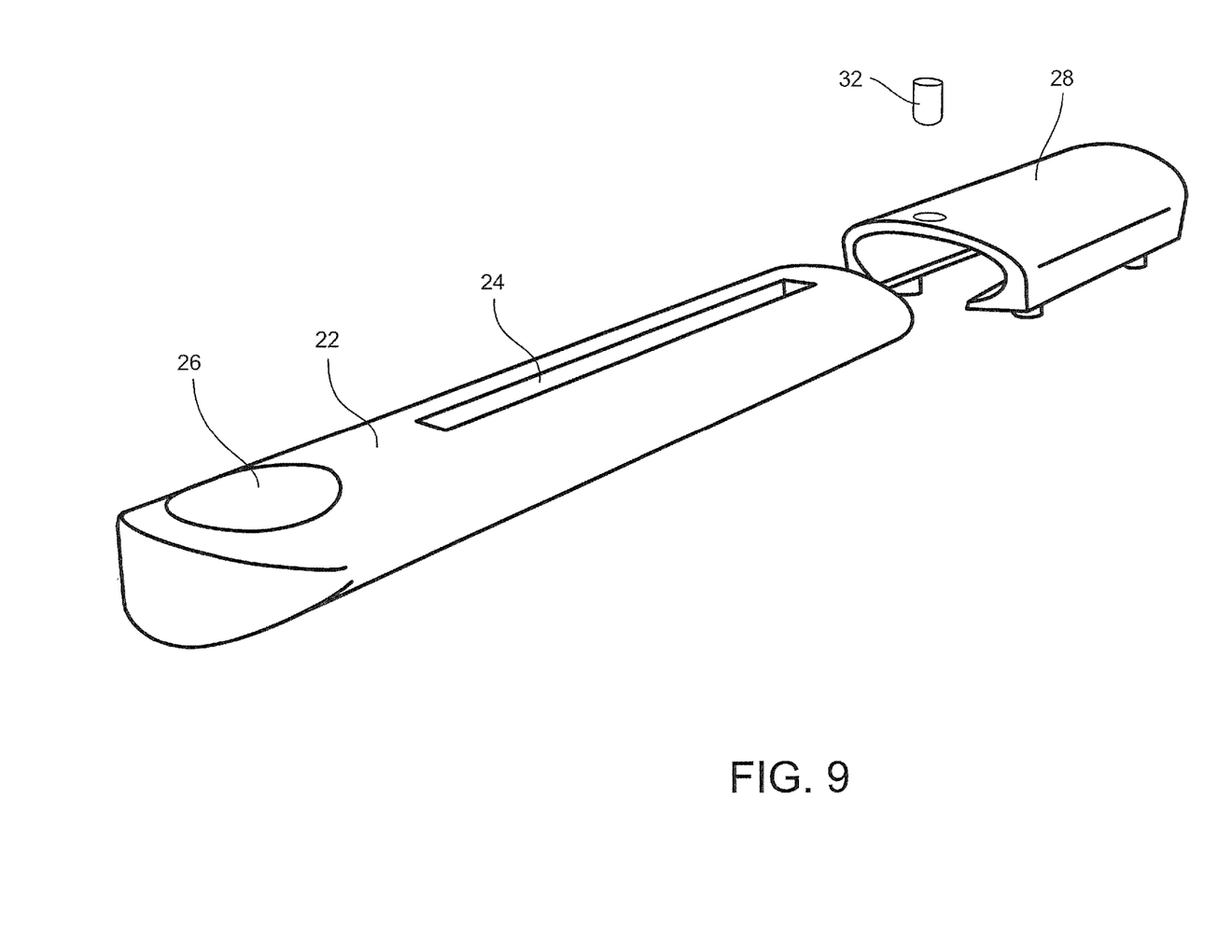
FIG. 9 is a perspective view of an embodiment of the elongate member and cover of the present invention.
Figure 10:
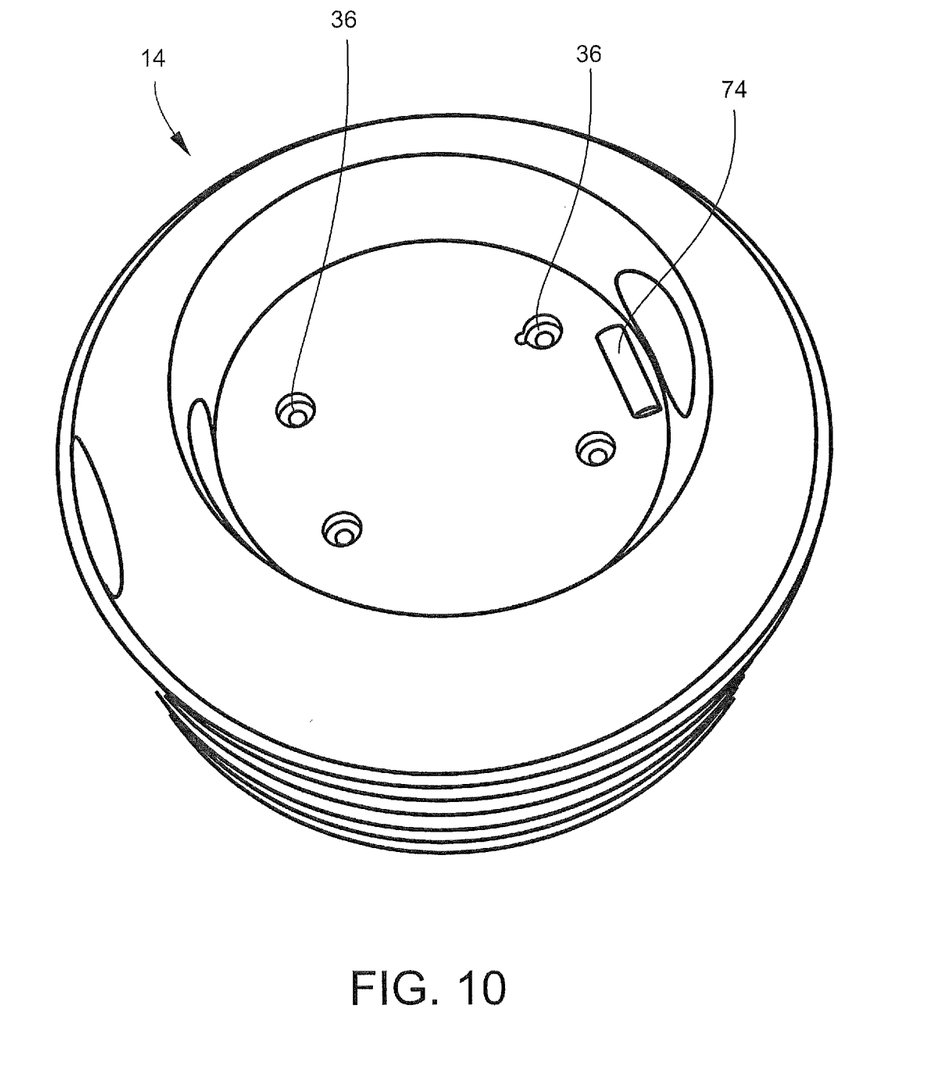
FIG. 10 is a top perspective view of an embodiment of the bottom portion of the present invention.

The top portion 14 contains an upper portion and a lower portion. The upper portion contains an annular circular side that extends upwardly and a cavity within the interior of the annular circular side, as illustrated in FIGS. 6, 8, and 10. The lower portion contains external threads that are recessed from the annular circular side. In other words, the external threads have a diameter that is smaller than the diameter of the annular circular side of the upper side of the bottom portion 12. A pair of bores 20 are disposed on opposed sides within the annular circular side and extend from the external side to the internal side of the annular circular side. As illustrated, the bores 20 are generally oval shaped, but these bores 20 may be circular, square, and the like for receiving a correspondingly shaped elongate member 22 that acts as a wrench or similar leverage based tool for unsecuring the bottom portion 12 from the top portion 14.

Figure 7:
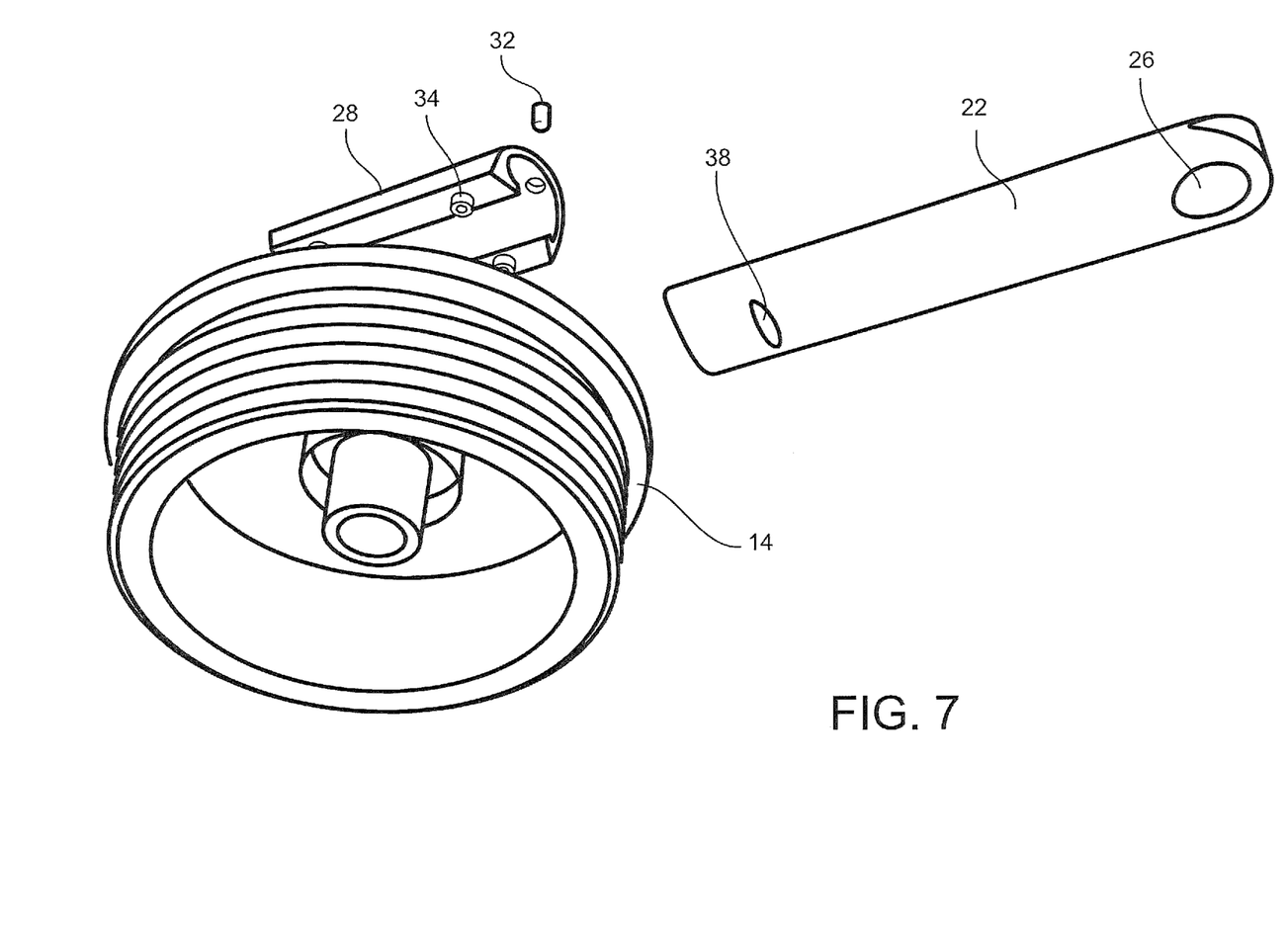
FIG. 7 is an exploded view of an embodiment of the bottom portion of the present invention.

As shown in FIG. 8, the elongate member 22 is received within the bores 20 and is slidingly received within the bores 20. The elongate member 22 has an elongate body with a first end, second end, top side, and a bottom side, as shown in FIGS. 6, 7, 8, and 9. A slot 24 is partially disposed along the top side of the elongate member 22, beginning in close proximity to the first end and extending towards the second end for about ¾ of the entire length of the elongate member 22. A dimple 26 is disposed on the second end of the elongate member 22 for allowing a user to easily grip the elongate member 22 during use. As illustrated, the dimple 26 is located on both the top side and bottom side of the second end of the elongate member 22. A notch 38 is disposed on the bottom side of the elongate member 22 in close proximity to the first end, as shown in FIG. 7. The elongate member 22 allows a user to easily and conveniently remove the top portion 14 without having to locate any special tools or like devices.

A cover 28 may be disposed on the upper portion of the bottom portion 12 of the device 10. The cover 28 may be arcuate in shape that corresponds with the shape of the elongate body of the elongate member 22 for allowing the cover 28 to easily slide over the elongate member 22. In other words, when the cover 28 is engaged to the elongate member 22, the cover 28 partially circumscribes the elongate member 22.

The center of the cover 28 is disposed overtop the slot 24 of the elongate member 22, and a hole 30 is disposed within the cover 28 and extending from the exterior side to the interior side of the cover 28. The hole 30 is positioned overtop the slot 24 of the elongate member 22. The hole 30 receives a pin 32 that extends through the underside of the hole 30 and protrudes past the interior side of the wrench cover 28. When the wrench cover 28 is in a selectively secured arrangement with the elongate member 22, the pin 32 extends into the slot 24. The pin 32 translates along the length of the slot 24, allowing the elongate member 22 to move the distance of the slot 24 until the pin 32 impedes movement.

The underside of the cover 28 may contain at least one knob 34, and the cavity of the bottom portion 12 contains a base portion with at least one opening 36 for releasably receiving the at least one knob 34. The number of openings 36 preferably coincides with the number of knobs 34 found on the cover 28. As shown in FIGS. 6 and 10, the base portion of the cavity of the top portion 12 contains four openings 36 for receiving four knobs 34 disposed on the underside of the cover 34. The knobs 34 may be internally threaded and the opening 36 contains a threaded bore for receiving a correspondingly threaded fastener for selectively securing the cover 28 to the bottom portion 12.

As mentioned above and shown in FIG. 7, the bottom side of the elongate member 22 contains a notch 38. The notch 38 is engaged to an interior stop 74, whereby the interior stop 74 prevents the elongate member 22 being completely removed from the bottom portion 12 and the cover 28, when the cover 28 is selectively engaged to the top portion 14.

The bottom portion 12 is generally cylindrical and contains a cavity 40 within the bottom portion 12. The cavity has an interior side and an exterior side. The bottom portion 12 contains a first side and a second side. The first side contains internal threads that correspondingly receive the threads on the lower portion of the top portion 14 for forming a selectively secured relationship. The diameter of the bottom portion 12 is slightly larger than the diameter of the lower portion of the top portion 14 for allowing the outer threads of the top portion 14 and inner threads of the bottom portion 12 to engage and form the selectively secured arrangement.

As shown in FIG. 3, the cavity 40 of the bottom portion 12 of the device 10 contains at least one elongate rib 42. The elongate rib 42 extends along the interior side of the cavity 40. Preferably, the device 10 contains two or more elongate ribs 42 along the interior side of the cavity 40. More preferably, the device 10 contains three elongate ribs 42 along the interior side of the cavity in a spaced-apart arrangement or equally spaced-apart arrangement. The elongate ribs 42 assist with the reception and placement of a filter element 16 within the cavity 40. In one embodiment, the filter element 16 contains an elongate trough along the exterior of the filter element 16 that receives the elongate rib 42 when the filter element 16 is inserted into the cavity 40. The elongate rib 42 assists in guiding the filter element 16 by way of the trough and assists in securing the filter element 16 within the cavity 40.

Figure 5:
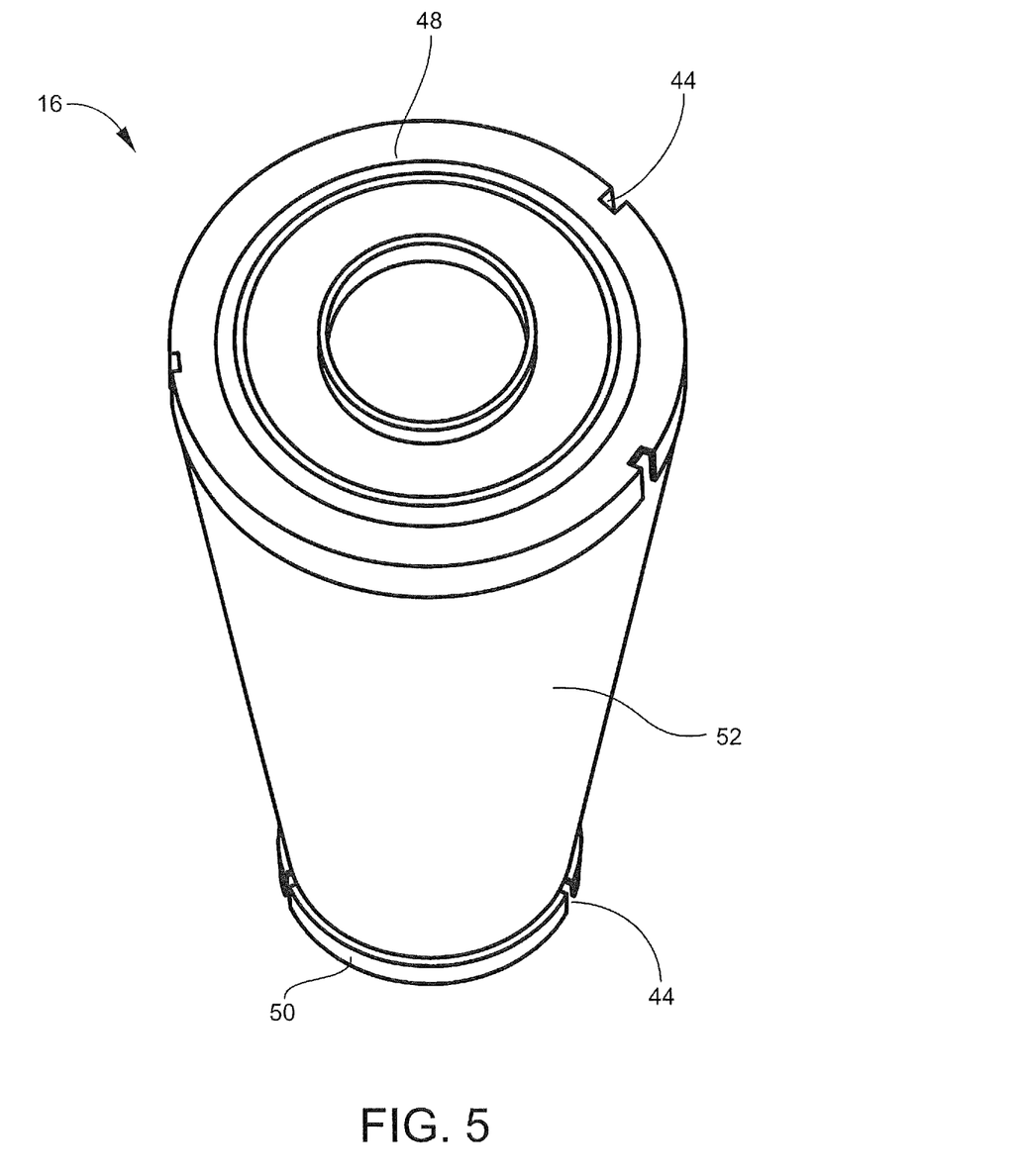
FIG. 5 is a top perspective view of an embodiment of the disposable filter element of the present invention.

Two spaced apart wings 76 extend generally outwardly from the second side of the top portion 14. The wings 76 are inserted into a valve 44 or top (not shown) for selectively securing the device 10 within the valve 44 or top (not shown). The filter element 16 may include a conventional carbon block filter. An exemplary filter element 16 is illustrated in FIG. 5. As illustrated, the filter element 16 contains a top portion 48, a bottom portion 50, and a carbon block disposed there between. A porous material 52 with a retaining element encompasses the carbon block and is disposed between the top portion 48 and the bottom portion 50. The top portion 48 of the filter element 16 contains the notch 38 formed within the top portion 48. As illustrated in FIG. 5, the top portion 48 contains three notches 38 disposed on the top portion 48 and bottom portion 50 of the filter element 16. The notches 38 on the top portion 48 and the bottom portion 50 of the filter element 16 are designed to be receiving within the elongate ribs 42 on the interior cavity 40 of the bottom portion 50. As the filter element 16 is slid within the cavity 40, the elongate ribs 42 are aligned with the notches 38 and positioned within the interior cavity 40 of the bottom portion 12. The filter element 16 is preferably disposable.

Figure 2:
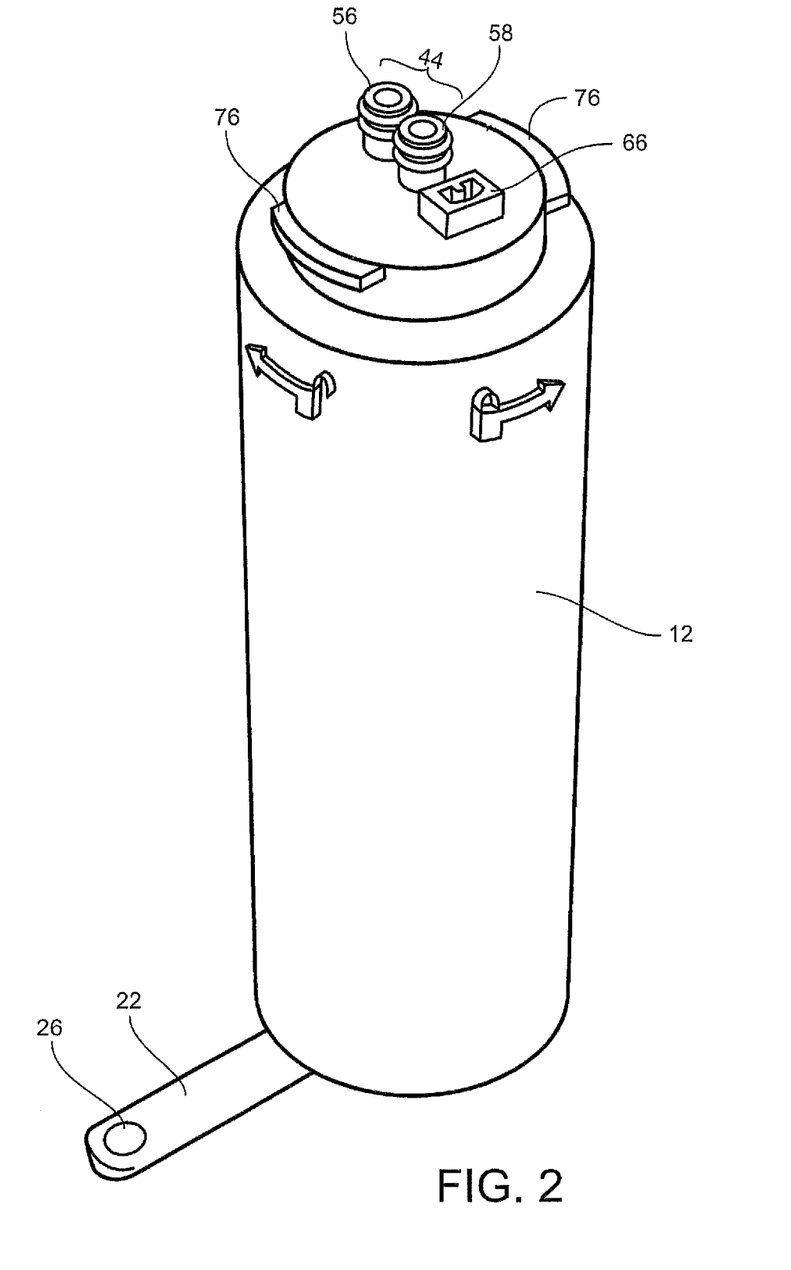
FIG. 2 is a perspective view of an embodiment of the present invention.
Figure 4:
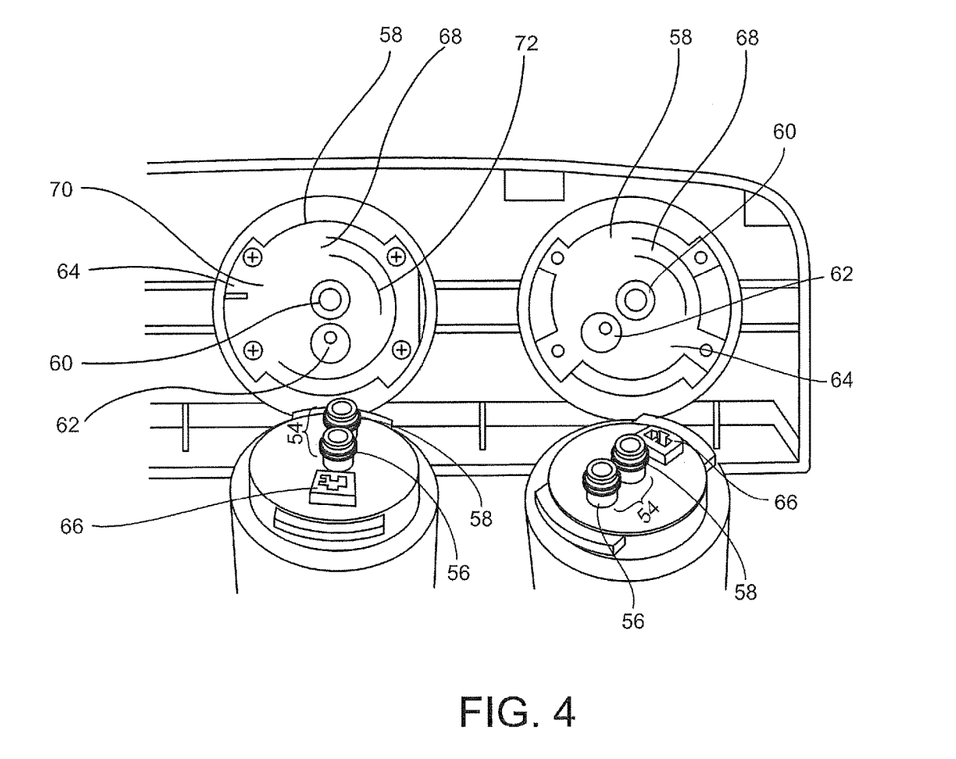
FIG. 4 is a view of the water shut off feature.

As illustrated in FIG. 4, a valve 54 is selectively secured to the second side of the top portion 14. The valve 54 contains a water inlet 56 and water outlet 58 on the top. The water that enters the valve 54 and is directed into the device 10, and after the water is filtered in the device 10, the water exits through the water outlet 58 of the valve 54. The water inlet 56 and water outlet 58 of the device 10 is selectively secured to corresponding receiving portions (inlet receiving portion 60, outlet receiving portion 62) disposed in the closure part 64. A retention part 66 may be disposed on the second side of the top portion 14 and contains an irregularly shaped cavity, as illustrated in FIG. 2. The closure part 64 contains a corresponding retention part 68 that is received within the cavity of the retention part 66.

The closure part 64 comprises a stationary part 70 and a rotational part 72. The rotational part 72 contains a stop that prevents the flow of water through the water inlet 56 and water outlet 58 of the valve 54. As illustrated in FIG. 4, in the open position, the rotational part 72 is in a position whereby the stop does not prevent the flow of water through the water inlet and water outlet of the valve 58. When the rotational part 72 is in the closed position, the stop prevents the flow of water through the water inlet and outlet of the valve 54. Additionally, the device 10 may only be removed from the valve 54, when the rotational part 72 is in the closed position, such that water is not flowing through the valve 54 and causing a mess.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A reusable water filter cartridge device comprising:
    a top portion having an upper portion and a lower portion, wherein the upper portion has an annular circular side that extends upwardly from a cavity within the interior of the annular circular side with a pair of spaced apart bores disposed on the annular circular side and extending from an external side of the annular circular side to an internal side of the annular circular side and an elongate member is received through the bores;
    a cover that partially circumscribes the elongate member, wherein the elongate member has a top side and contains a slot partially disposed along the top side of the elongate member and the cover is disposed overtop the slot, an underside of the cover contains at least one knob and a base portion of the cavity of the top portion contains at least one opening for releasably receiving the at least one knob of the cover;
    a bottom portion selectively secured to the top portion and including a cavity; and
    a filter element contained within the cavity.

2. The reusable water filter cartridge device of claim 1, further comprising an o-ring disposed between the bottom portion and the top portion to create a water tight seal between the bottom portion and the top portion.

3. The reusable water filter cartridge device of claim 1, wherein the top portion contains external threads and the bottom portion contains corresponding inner threads, which receive the external threads of the top portion for selectively securing the bottom portion and the top portion.

4. The reusable water filter cartridge device of claim 1, wherein the underside of the cover contains four knobs and the base portion of the cavity of the top portion contains four openings for releasably receiving the four knobs of the cover.

5. The reusable water filter cartridge device of claim 1, further comprising a center of the cover is disposed overtop the slot and contains a pin extending therefrom that is received within the slot.

6. The reusable water filter cartridge device of claim 1, wherein the filter element contains a top side, a bottom side, and a carbon block disposed between the bottom side and the top side, whereby the bottom side and top side contain at least one notch.

7. The reusable water filter cartridge device of claim 1, wherein the cavity contains an interior stop and the elongate member includes an underside with a notch disposed on a bottom portion of the elongate member, the notch is received within the interior stop for preventing the elongate member from being completely removed from the bottom portion and the cover.

8. A reusable water filter cartridge device comprising:
   a top portion having an upper portion and a lower portion, wherein the upper portion has an annular circular side that extends upwardly from a cavity within the interior of the annular circular side with a pair of spaced apart bores disposed on the annular circular side and extending from an external side of the annular circular side to an internal side of the annular circular side and an elongate member is received through the bores;
   a bottom portion containing a cavity having an interior side and an exterior side;
   a cover that partially circumscribes the elongate member, wherein the elongate member has a top side and contains a slot partially disposed along the top side of the elongate member and the cover is disposed overtop the slot, an underside of the cover contains at least one knob and the cavity of the bottom portion contains at least one opening for releasably receiving the at least one knob of the cover;
   at least one elongate rib disposed on the interior side of the cavity of the bottom portion;
   a filter element having a top side and a bottom side contained within the cavity; and
   at least one notch disposed on the top side and bottom side of the filter element for receiving the at least one elongate rib disposed on an inner side of the cavity.

9. The reusable water filter cartridge device of claim 8, wherein the underside of the cover contains four knobs and a base portion of the cavity of the top portion contains four openings for releasably receiving the four knobs of the cover.

10. The reusable water filter cartridge device of claim 8, further comprising at least one generally circular dimple disposed on an end of the elongate member that is selectively secured to the top portion.

11. The reusable water filter cartridge device of claim 8, wherein the top portion contains external threads and the bottom portion contains corresponding inner threads, which receive the external threads of the top portion for selectively securing the bottom portion and the top portion.

12. A reusable water filter cartridge device comprising:
   a top portion having an upper portion and a lower portion, wherein the upper portion has an annular circular side that extends upwardly from a cavity within the interior of the annular circular side with a pair of spaced apart bores disposed on the annular circular side and extending from an external side of the annular circular side to an internal side of the annular circular side and an elongate member is received through the bores, the top portion includes external threads;
   a bottom portion having a cavity and containing internal threads that correspond with the external threads of the top portion for selectively securing the bottom portion to the top portion; and
   a cover that partially circumscribes the elongate member, wherein the elongate member has a top side and contains a slot partially disposed along the top side of the elongate member and the cover is disposed overtop the slot, an underside of the cover contains at least one knob and a base portion of the cavity of the top portion contains at least one opening for releasably receiving the at least one knob of the cover;
   a disposable filter element contained within the cavity.

13. The reusable water filter cartridge device of claim 12, wherein the disposable filter element has a top side, a bottom side, and a carbon block disposed between the top portion and the bottom portion, whereby the top side and bottom side contain at least one notch.

14. The reusable water filter cartridge device of claim 12, wherein the cavity of the bottom portion has an inner side containing at least one elongate rib for receiving at least one corresponding notch contained on the disposable filter element.

15. The reusable water filter cartridge device of claim 12, wherein an underside of the cover contains four knobs and the cavity of the bottom portion contains four openings for releasably receiving the four knobs of the cover.

* * * * *

UNITED STATES PATENT AND TRADEMARK OFFICE
CERTIFICATE OF CORRECTION

PATENT NO. : 9,956,511 B2
APPLICATION NO. : 14/657211
DATED : May 1, 2018
INVENTOR(S) : Lackey et al.

It is certified that error appears in the above-identified patent and that said Letters Patent is hereby corrected as shown below:

On the Title Page

Column 1, item (60) Related U.S. Application Data:
Change "Provisional application No. 61/983,006, filed on Mar. 14, 2014" to
This application claims benefit to Provisional application No. 61/983,006, filed on Mar. 14, 2014.

Signed and Sealed this
Third Day of July, 2018

Andrei Iancu
*Director of the United States Patent and Trademark Office*